United States Patent
Nishijima (10) Patent No.: US 9,882,495 B2
(45) Date of Patent: Jan. 30, 2018

(54) SWITCHING POWER SUPPLY WITH INTERNAL POWER SUPPLY CIRCUIT

(71) Applicant: Fuji Electric Co., Ltd., Kanagawa (JP)

(72) Inventor: Kenichi Nishijima, Nagano (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 9 days.

(21) Appl. No.: 15/009,643

(22) Filed: Jan. 28, 2016

(65) Prior Publication Data

US 2016/0226384 A1 Aug. 4, 2016

(30) Foreign Application Priority Data

Feb. 2, 2015 (JP) .................................. 2015-018683

(51) Int. Cl.
*H02M 3/335* (2006.01)
*H02M 1/00* (2006.01)

(52) U.S. Cl.
CPC ....... *H02M 3/33523* (2013.01); *H02M 3/335* (2013.01); *H02M 3/33507* (2013.01); *H02M 2001/0006* (2013.01); *H02M 2001/0025* (2013.01)

(58) Field of Classification Search
CPC ................................................ H02M 3/33523
See application file for complete search history.

(56) References Cited

U.S. PATENT DOCUMENTS

| 2009/0008995 | A1* | 1/2009 | Cyr | ................... | H02M 3/33561 |
| | | | | | 307/31 |
| 2013/0250627 | A1* | 9/2013 | Herfurth | ........... | H02M 3/33507 |
| | | | | | 363/21.15 |
| 2014/0239829 | A1* | 8/2014 | Zhang | ................ | H05B 33/0815 |
| | | | | | 315/200 R |

FOREIGN PATENT DOCUMENTS

JP 2011-139564 A 7/2011

* cited by examiner

*Primary Examiner* — Jue Zhang
*Assistant Examiner* — Trinh Dang
(74) *Attorney, Agent, or Firm* — Chen Yoshimura LLP (57) ABSTRACT

A switching power supply includes a switching element that turns ON and OFF a current flowing through a primary coil of a transformer to which a DC input voltage is applied, an output circuit that rectifies and smooths a voltage induced in a secondary coil of the transformer T to generate a prescribed output voltage, and a control circuit that uses feedback control to turn the switching element ON and OFF according to a feedback voltage obtained from the detected output voltage. The switching power supply also includes a supply voltage generation circuit that rectifies and smooths a voltage induced in an auxiliary coil of the transformer to generate a plurality of supply voltages, an output voltage switching circuit that switches the output voltage according to a magnitude of a load to which the output voltage is supplied, and a supply voltage switching circuit that selects one of the supply voltages according to changes to the output voltage and supplies that supply voltage to the control circuit.

12 Claims, 6 Drawing Sheets

SWITCHING POWER SUPPLY WITH INTERNAL POWER SUPPLY CIRCUIT

BACKGROUND OF THE INVENTION

Technical Field

The present invention relates to a switching power supply with a feature for switching the output voltage according to the state of a load.

Background Art

Figure 3:
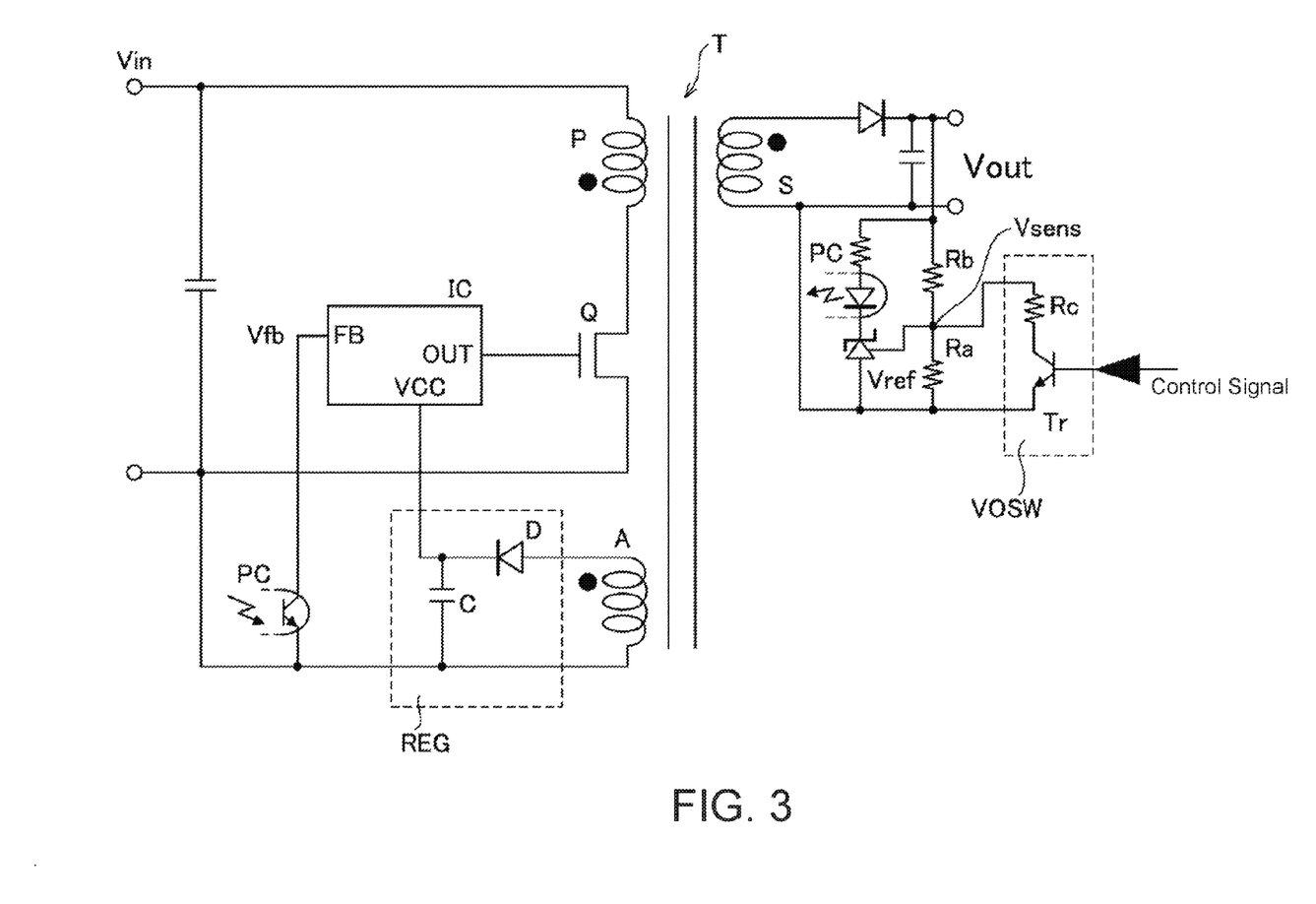
FIG. 3 schematically illustrates a configuration of a conventional switching power supply.

Flyback-type switching power supplies have attracted attention as power supplies for driving low capacity electrical power loads. As illustrated in FIG. 3, this type of switching power supply typically includes a switching element Q that turns ON and OFF the current flowing through a primary coil P of a transformer T to which an input voltage Vin is applied. This switching element Q is a power MOSFET, an IGBT device, or the like. These types of switching power supplies are also equipped with a rectifying and smoothing circuit that rectifies and smooths the voltage induced in a secondary coil S of the transformer T to generate a DC output voltage Vout. The switching element Q is turned ON and OFF according to this output voltage Vout using feedback control.

A control circuit IC that controls the switching element Q typically turns the switching element Q off when the current flowing while the switching element Q is on produces a certain feedback voltage Vfb calculated according to the output voltage Vout. Then, when the current flowing through the transformer T inverts while the switching element Q is off, the control circuit IC turns the switching element Q back on to achieve quasi-resonance in the current flowing in the transformer T.

The feedback voltage Vfb is detected as the difference between a prescribed reference voltage Vref and a detected voltage Vsens detected by resistively dividing the output voltage Vout and is then fed back into the control circuit IC using a photocoupler PC, for example. Moreover, a supply voltage VCC for the control circuit IC is generated using a supply voltage generation circuit REG that includes a diode D and a capacitor C that rectify and smooth a voltage induced in an auxiliary coil A, for example.

Figure 4:
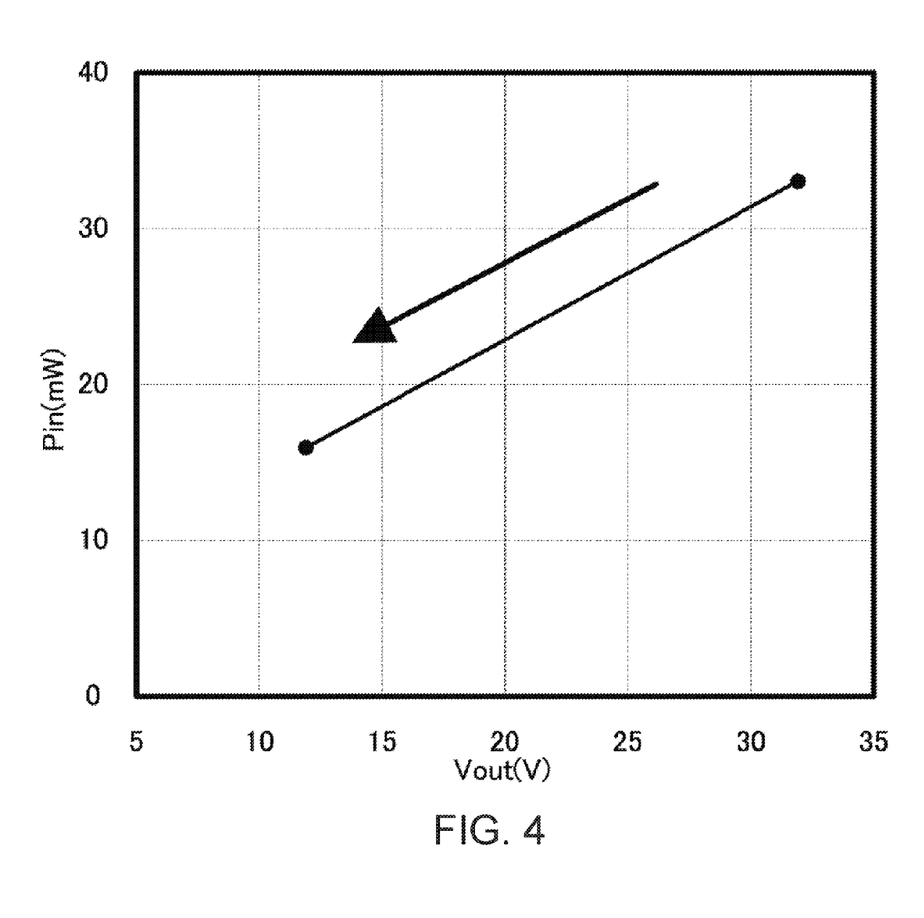
FIG. 4 illustrates the changes in power consumption when the output voltage decreases.

In this type of switching power supply, the output voltage Vout is changed according to the state of the load in order to reduce power consumption. More specifically, an output voltage switching control scheme is implemented such that if the output voltage Vout during normal loading is 32V, for example, the output voltage Vout is switched to 12V during light loading or when no load is present, or if the output voltage Vout during normal loading is 24V, the output voltage Vout is switched to 8V during light loading or when no load is present, for example. This output voltage switching control scheme reduces the standby power consumption of the switching power supply. As illustrated in FIG. 4, changes in power consumption Pin of the switching power supply due to changes in the output voltage Vout follow a trend in which as the output voltage Vout decreases, the power consumption Pin also decreases.

In conventional technologies such as the example illustrated in FIG. 3, this type of output voltage switching control scheme was implemented entirely by changing the voltage-dividing ratio of resistors Ra and Rb that obtain the detected voltage Vsens by dividing the output voltage Vout according to external control signals. More specifically, an output voltage switching circuit VOSW receives the external control signals and turns ON and OFF a switching element (a transistor) Tr to selectively connect a resistor Rc in parallel to the resistor Ra, thereby changing the detection ratio between the detected voltage Vsens and the output voltage Vout. Therefore, the output voltage Vout can be increased by turning the switching element Tr on and decreased by turning the switching element Tr off. Patent Document 1, for example, discloses an example of this type of output voltage switching control scheme in detail.

RELATED ART DOCUMENT

Patent Document

Patent Document 1: Japanese Patent Application Laid-Open Publication No. 2011-139564

SUMMARY OF THE INVENTION

Figure 5:
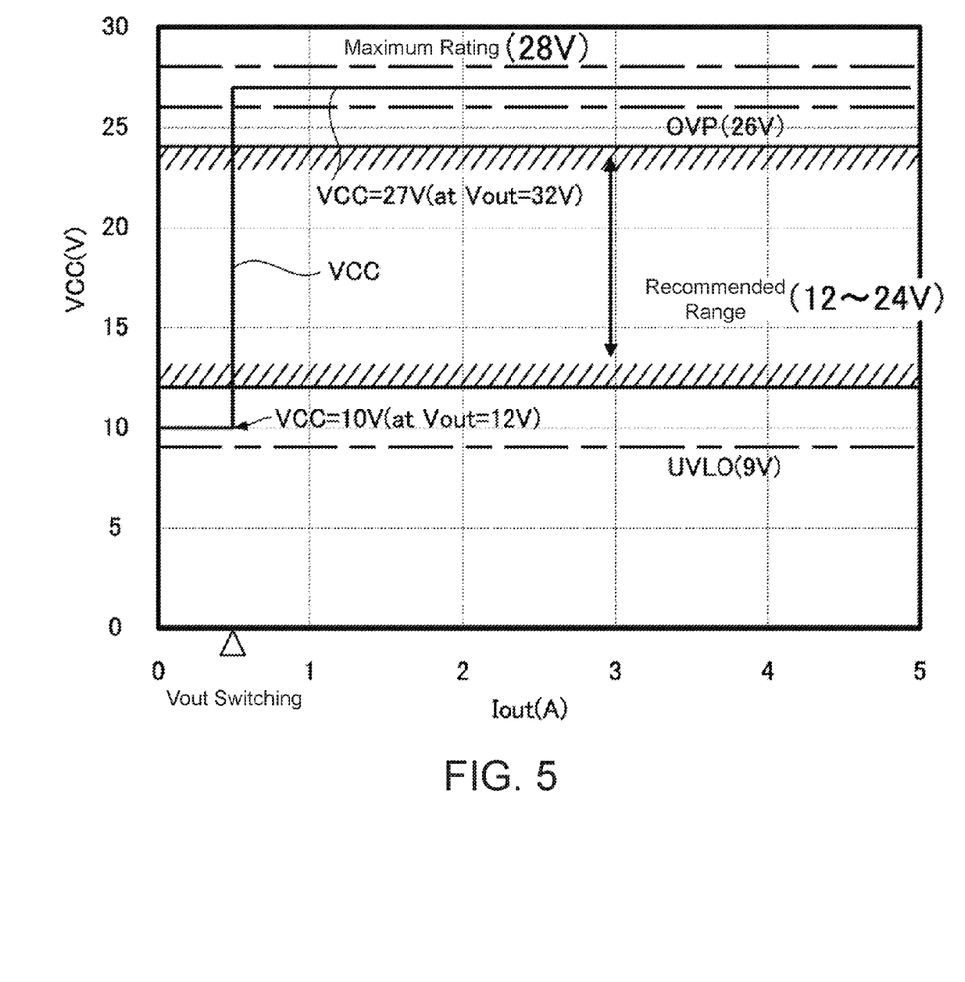
FIG. 5 illustrates the relationship among a supply voltage VCC, a maximum rated voltage, an overvoltage protection threshold voltage OVP, and an undervoltage-lockout threshold voltage UVLO in a control circuit.

However, in a switching power supply configured as described above, changing the output voltage Vout according to the state of the load also changes the supply voltage VCC generated by the supply voltage generation circuit REG and applied to the control circuit IC. Such changes in the supply voltage VCC are problematic because as illustrated in FIG. 5, these changes reduce the margin between the supply voltage VCC and an overvoltage protection threshold voltage OVP, an undervoltage-lockout threshold voltage UVLO, and the maximum rated voltage of the control circuit IC, for example.

To address these types of problems associated with changes in the supply voltage VCC, a simple constant-voltage circuit can be integrated into the supply voltage generation circuit REG to make the supply voltage VCC constant. However, control circuits IC with an overvoltage protection feature are typically configured to protect the control circuit IC from overvoltage by monitoring the supply voltage VCC from the supply voltage generation circuit REG. As a result, if the supply voltage VCC is fixed using a constant-voltage circuit, the overvoltage protection feature of the control circuit IC will no longer work. Moreover, making the supply voltage VCC constant presents additional problems such as making it necessary to detect for overvoltage using a different scheme and making it necessary to add an additional detection terminal for overvoltage protection to the control circuit IC.

Meanwhile, in more recent technologies the overvoltage protection threshold voltage OVP tends to be set very high and the undervoltage-lockout threshold voltage UVLO tends to be set very low in the control circuit IC while the constant-voltage circuit is omitted altogether in order to reduce the total number of component parts. In this case, the supply voltage VCC can be optimized by adjusting the ratio (Ns/Na) between the number of coils in the secondary coil S and the auxiliary coil A of the transformer T. However, this solution also presents problems such as potentially reducing the margin between the supply voltage VCC and the maximum rated voltage of the control circuit IC due to variations in component performance during mass production or the like.

Figure 6:
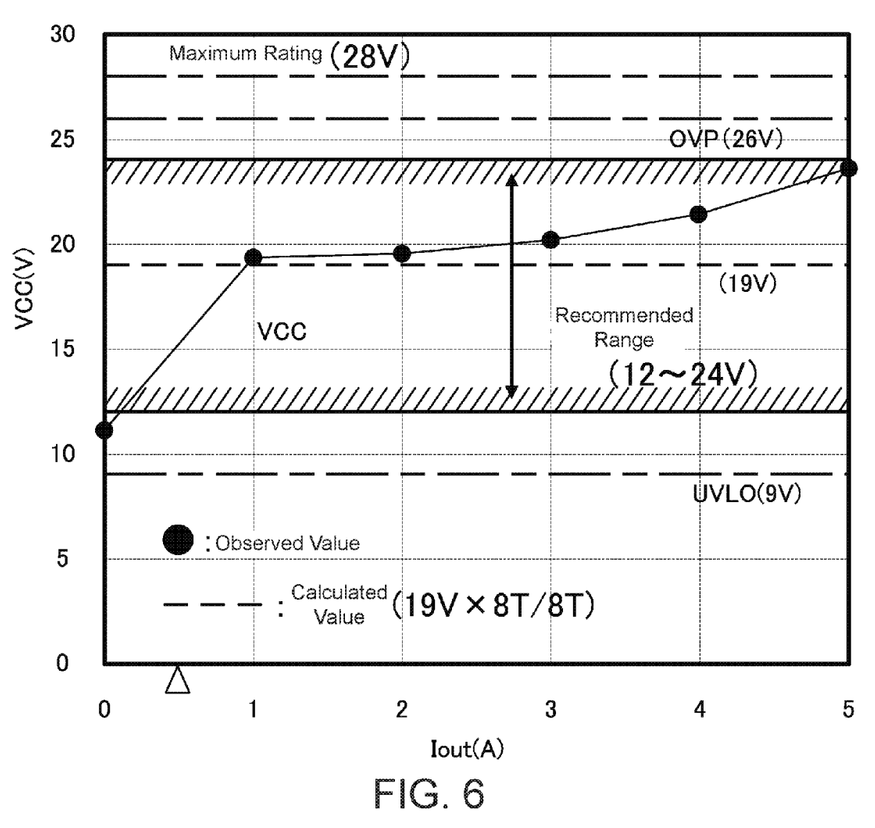
FIG. 6 illustrates the changes in a supply voltage VCC according to the current consumption and the like of a control circuit IC.

Moreover, the supply voltage VCC depends on the degree of coupling between the coils of the transformer T, the frequency at which the switching power supply operates, and the current consumption of the control circuit IC. As illustrated in FIG. 6, for example, the supply voltage VCC does not remain constant like the calculated value indicated by the dashed line. Therefore, in order to guarantee that the control circuit IC continues to operate in a stable manner while still having an overvoltage protection feature and a undervoltage-lockout feature implemented, the supply voltage VCC must be switched to remain within a recommended operating range that includes margins relative to the overvoltage protection threshold voltage OVP and the undervoltage-lockout threshold voltage UVLO.

The present invention was made in view of the above-mentioned problems and aims to provide a switching power supply that has a function for switching the output voltage according to the state of a load and has a simple configuration in which stable operation of the control circuit that switches the switching element ON and OFF is guaranteed even when switching the output voltage. Accordingly, the present invention is directed to a scheme that substantially obviates one or more of the above-discussed and other problems due to limitations and disadvantages of the related art.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a switching power supply, including: a switching element that turns ON and OFF a current flowing through a primary coil of a transformer to which a DC input voltage is applied; an output circuit that rectifies and smoothes a voltage induced in a secondary coil of the transformer to obtain an output voltage; a control circuit that uses feedback control to turn ON and OFF the switching element in accordance with a feedback voltage obtained from the output voltage of the output circuit so as to generate the output voltage that is feedback controlled; and a supply voltage generation circuit that rectifies and smoothes voltages induced in an auxiliary coil provided in the transformer to generate a plurality of supply voltages.

The switching power supply according to at least one aspect of the present invention also includes an output voltage switching circuit that changes a relationship between the feedback voltage and the output voltage of the output circuit in accordance with a control signal provided from outside so as to set a target voltage for the feedback controlled output voltage in accordance with the control signal; and a supply voltage switching circuit that selects one of the supply voltages generated by the supply voltage generation circuit and supplies the selected one of the supply voltages to the control circuit as a power source of the control circuit, the supply voltage switching circuit selecting the one of the supply voltages in accordance with the setting of the target voltage performed by the output voltage switching circuit.

In one aspect, the control circuit turns the switching element OFF when the feedback voltage reaches a prescribed internal reference voltage and turns the switching element ON when the current flowing through the primary coil of the transformer while the switching element is OFF has inverted so as to generate a switching element drive signal that causes quasi-resonance in the current flowing through the primary coil of the transformer.

In one aspect, the feedback voltage is obtained as a difference between a prescribed reference voltage and a detected voltage that is detected by resistively dividing the output voltage, and the output voltage switching circuit changes a resistive division ratio for dividing the output voltage in accordance with the control signal so as to change the relationship between the feedback voltage and the output voltage of the output circuit.

In one aspect, the auxiliary coil of the transformer has a center tap, and the supply voltage generation circuit rectifies and smoothes a voltage induced between end terminals of the auxiliary coil to generate a first supply voltage, and rectifies and smoothes a voltage induced between the center tap and one of the end terminals of the auxiliary coil to generate a second supply voltage. In another aspect, the supply voltage switching circuit includes a pair of switching elements that are turned ON and OFF in a complementary manner in accordance with the control signal so as to supply one of the first and second supply voltages to the control circuit, for example.

In one aspect, the auxiliary coil of the transformer has a center tap, and the supply voltage generation circuit rectifies and smoothes a voltage induced between end terminals of the auxiliary coil to generate a first supply voltage, and rectifies and smoothes a voltage induced between the center tap and one of the end terminals of the auxiliary coil to generate a second supply voltage, and when the control signal causes the feedback controlled output voltage provided to a load to be set to a prescribed normal voltage, the supply voltage switching circuit selects the second supply voltage and supplies the second supply voltage to the control circuit, and when the control signal causes the output voltage to switch to a standby voltage that is lower than the prescribed normal voltage, the supply voltage switching circuit selects the first supply voltage and supplies the first supply voltage to the control circuit, for example.

In one aspect, the first and second supply voltages are set within a range defined by an overvoltage protection threshold voltage OVP and an undervoltage lockout threshold voltage UVLO of the control circuit.

In the switching power supply configured as described above, one of the supply voltages generated by rectifying and smoothing voltages induced in the auxiliary coil of the transformer and obtained between end terminals or at a center tap of the auxiliary coil is selected according to changes to the output voltage and applied to the control circuit. More specifically, during normal loading when the output voltage is set relatively high, the supply voltage is generated from a voltage that is obtained at the center tap of the auxiliary coil and that is lower than the output voltage. During light loading or no loading when the output voltage is set relatively low, the supply voltage is generated from a voltage that is obtained between the end terminals of the auxiliary coil and that is approximately equal to or greater than the output voltage.

This makes it possible to keep the supply voltage for the control circuit substantially constant even when the output voltage is switched, thereby making it possible to reduce the magnitude of changes in the supply voltage due to switching the output voltage. This also makes it possible to keep the supply voltage applied to the control circuit within a typical recommended range even when the output voltage is switched. This, in turn, makes it possible to guarantee that the control circuit IC will operate in a stable manner while still having an overvoltage protection feature and an undervoltage-lockout feature implemented.

It is to be understood that both the foregoing general description and the following detailed description are exemplary and explanatory, and are intended to provide further explanation of the invention as claimed.

DETAILED DESCRIPTION OF EMBODIMENTS

Next, a switching power supply according to an embodiment of the present invention will be described with reference to figures.

Figure 1:
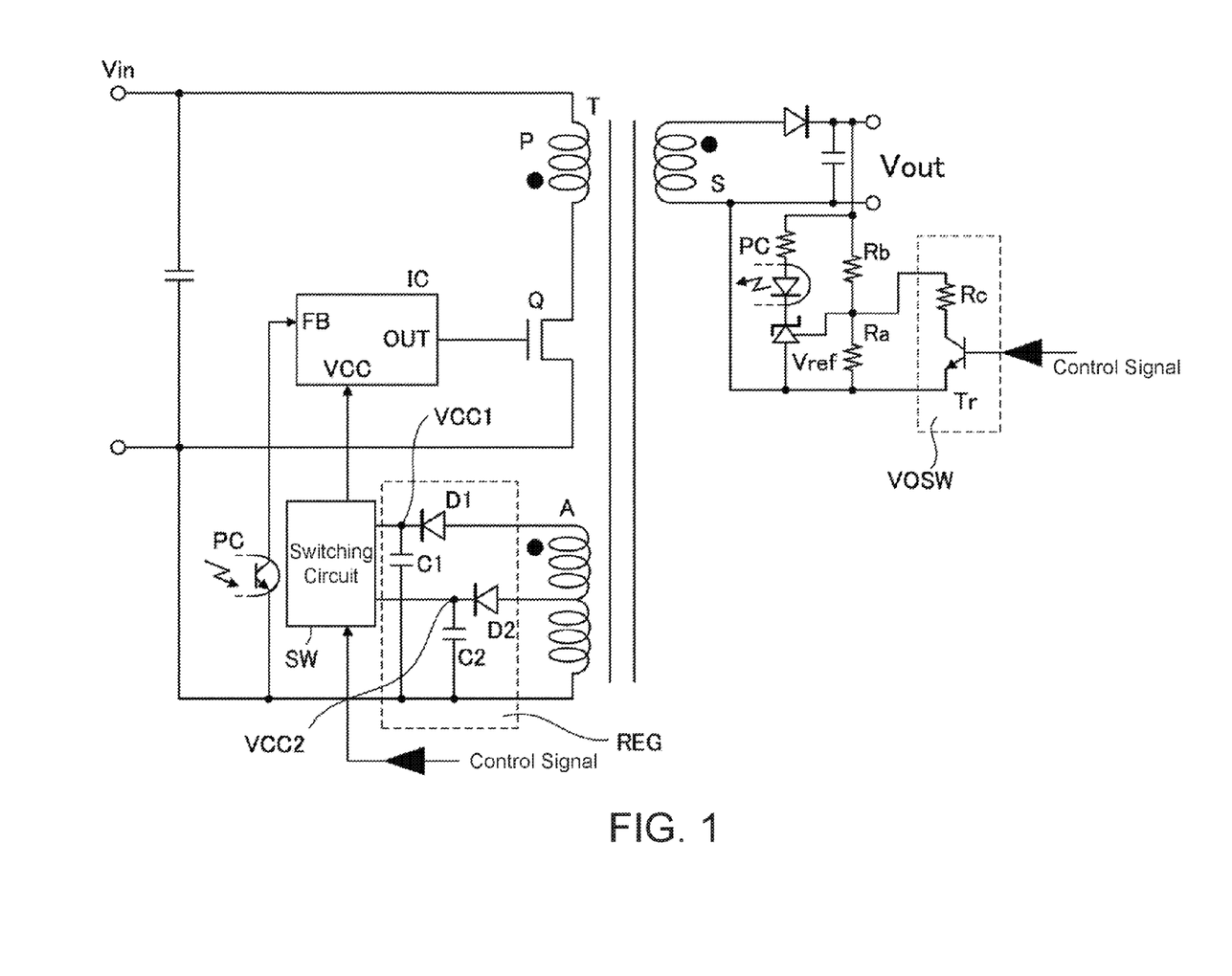
FIG. 1 schematically illustrates a configuration of a switching power supply according to an embodiment of the present invention.

FIG. 1 schematically illustrates a configuration of a switching power supply according to an embodiment of the present invention. The same reference characters are used for components of this switching power supply that are the same as in the conventional switching power supply illustrated in FIG. 3, and descriptions of those components are omitted here.

As illustrated in FIG. 1, in at least one aspect, the characteristic feature of the switching power supply of the present embodiment is a center tap formed in an auxiliary coil A of a transformer T. This makes it possible to tap the voltage induced in the auxiliary coil A both between the end terminals and at the center tap point. Furthermore, a supply voltage generation circuit REG rectifies and smooths the voltage obtained between the end terminals of the auxiliary coil A and the voltage obtained at the center tap of the auxiliary coil A to generate a plurality of supply voltages VCC1 and VCC2.

The supply voltage generation circuit REG that generates the supply voltages VCC1 and VCC2 includes a first rectifying and smoothing circuit made using a diode D1 and a capacitor C1 and a second rectifying and smoothing circuit made using a diode D2 and a capacitor C2, and these rectifying and smoothing circuits are connected in parallel. The first rectifying and smoothing circuit rectifies and smooths the voltage obtained between the end terminals of the auxiliary coil A to generate the supply voltage VCC1. The second rectifying and smoothing circuit rectifies and smooths the voltage obtained at the center tap of the auxiliary coil A to generate the supply voltage VCC2.

Letting the number of coils of a secondary coil S of the transformer T be Ns, the total number of coils of the auxiliary coil A be Na, and the voltage induced in the secondary coil S be V, the voltage induced between the end terminals of the auxiliary coil A is (Na/Ns)V, which is proportional to V. Therefore, the supply voltage VCC1 generated by the first rectifying and smoothing circuit relative to the output voltage Vout of the switching power supply is given by:

$$VCC1=(Na/Ns)Vout.$$

Moreover, letting the number of coils from one of the end terminals to the center tap of the auxiliary coil A be Nb (<Na) and the voltage induced in the secondary coil S again be V, the voltage induced at the center tap of the auxiliary coil A is (Nb/Ns)V. Therefore, the supply voltage VCC2 generated by the second rectifying and smoothing circuit relative to the output voltage Vout of the switching power supply is given by:

$$VCC2=(Nb/Ns)Vout.$$

Furthermore, the supply voltage VCC1 is proportional to the supply voltage VCC2 by the ratio (Nb/Na) between the total number of coils Na and the number of coils Nb to the center tap of the auxiliary coil A, as given by:

$$VCC2=(Nb/Na)VCC1.$$

A supply voltage switching circuit SW selects either the supply voltage VCC1 or the supply voltage VCC2 generated by the supply voltage generation circuit REG configured as described above according to changes to the output voltage Vout and then applies the selected supply voltage to a control circuit IC. More specifically, the supply voltage switching circuit SW selects either the supply voltage VCC1 or the supply voltage VCC2 according to a control signal that controls the behavior of an output voltage switching circuit VOSW. When the output voltage Vout is set to a load driving voltage Vout1, the supply voltage switching circuit SW selects and outputs the supply voltage VCC2 obtained at the center tap of the auxiliary coil A to the control circuit IC. Moreover, when the output voltage Vout is set to a standby voltage Vout2 that is less than the load driving voltage Vout1, the supply voltage switching circuit SW selects and outputs the supply voltage VCC1 obtained between the end terminals of the auxiliary coil A to the control circuit IC.

Figure 2:
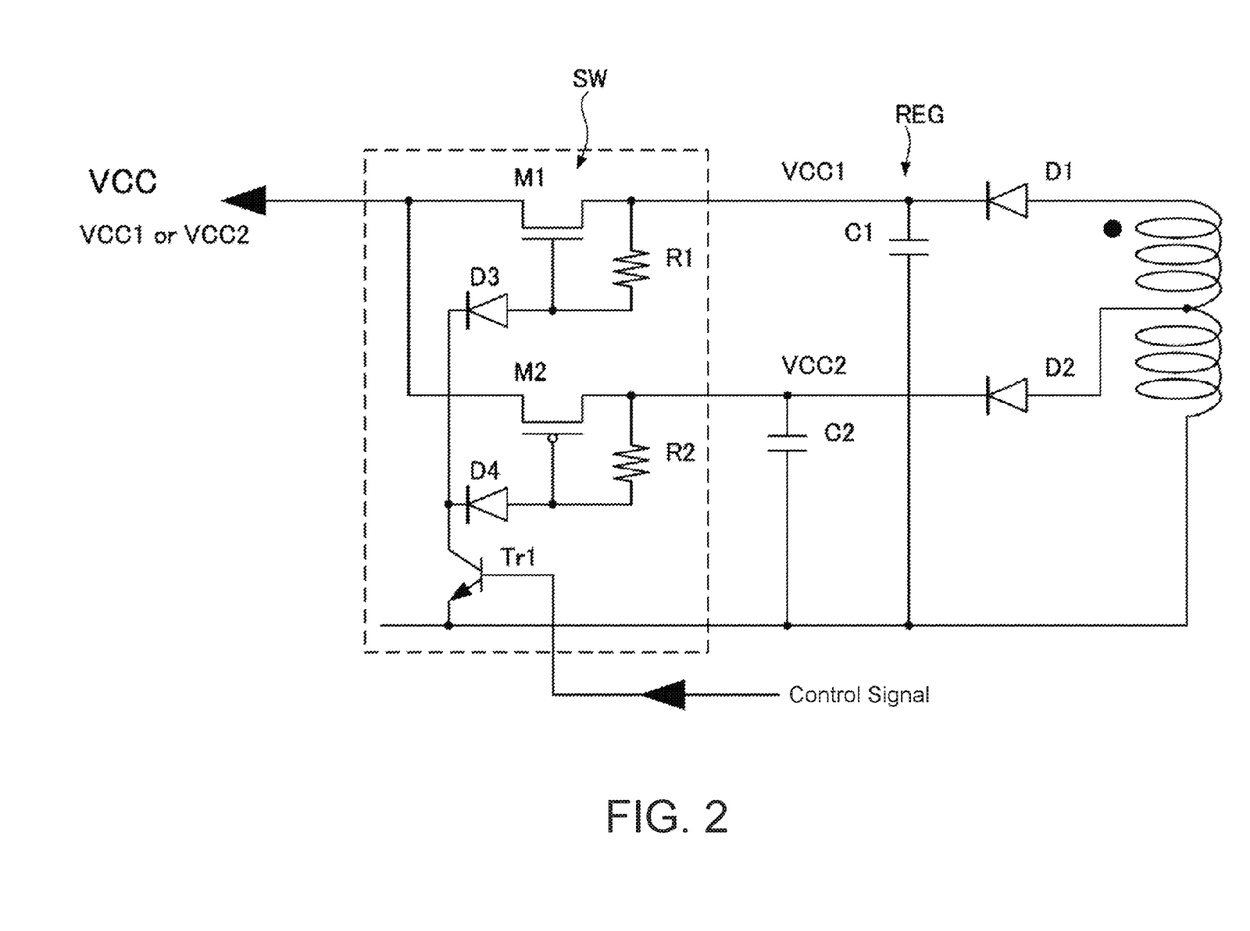
FIG. 2 illustrates an example of a configuration of a supply voltage switching circuit for the switching power supply illustrated in FIG. 1.

As illustrated in FIG. 2, the supply voltage switching circuit SW includes a first switching element M1 connected in series to an output line for the supply voltage VCC1 and a second switching element M2 connected in series to an output line for the supply voltage VCC2, for example. The first switching element M1 is an N-channel MOSFET, and the second switching element M2 is a P-channel MOSFET, for example.

A transistor Tr1 that receives and is turned ON and OFF by the control signal controls the gate voltages applied via diodes D3 and D4 to the first and second switching elements M1 and M2, respectively, to turn the switching elements M1 and M2 ON and OFF in a complementary manner. Moreover, resistors R1 and R2 are connected between the gate and source lines of the first and second switching elements M1 and M2, respectively, to apply a resistive load to the transistor Tr1.

In the supply voltage switching circuit SW configured as described above, when the output voltage Vout is set to the load driving voltage Vout1, the control signal turns the transistor Tr1 on, and the output from the transistor Tr1 turns the first switching element M1 off and the second switching element M2 on. As a result, the supply voltage VCC2 is selected via the second switching element M2 and output to the control circuit IC. Meanwhile, when the output voltage Vout is set to the standby voltage Vout2, the control signal turns the transistor Tr1 off, and the output from the transistor Tr1 turns the first switching element M1 on and the second switching element M2 off. As a result, the supply voltage VCC1 is selected via the first switching element M1 and output to the control circuit IC.

Here, the supply voltage VCC2 selectively output by the supply voltage switching circuit SW when the output voltage Vout is set to the load driving voltage Vout1 is generated from the voltage obtained at the center tap of the auxiliary coil A. This supply voltage VCC2 is therefore given by:

VCC2=(Nb/Ns)Vout1

More specifically, if the load driving voltage Vout1 is 32V and the ratio between the number of coils Ns of the secondary coil S of the transformer T and the number of coils Nb up to the center tap of the auxiliary coil A is (12 T/6 T), the supply voltage VCC2 would be:

VCC2=(6 T/12 T)·32V=16V.

Meanwhile, the supply voltage VCC1 selectively output by the supply voltage switching circuit SW when the output voltage Vout is set to the standby voltage Vout2 is generated from the voltage obtained between the end terminals of the auxiliary coil A. This supply voltage VCC2 is therefore given by:

VCC1=(Na/Ns)Vout2.

More specifically, if the standby voltage Vout2 is 12V and the ratio between the number of coils Ns of the secondary coil S of the transformer T and the total number of coils Na of the auxiliary coil A is (12 T/16 T), the supply voltage VCC1 would be:

VCC1=(16 T/12 T)·12V=16V.

Therefore, even when the output voltage Vout is selectively switched between the load driving voltage Vout1 of 32V and the standby voltage Vout2 of 12V, the supply voltage VCC sent to the control circuit IC can be kept substantially constant at the supply voltage VCC2 of 16V or the supply voltage VCC1 of 16V.

This makes it possible to maintain a sufficient margin between the supply voltage VCC sent to the control circuit IC and the overvoltage protection threshold voltage OVP and the undervoltage-lockout threshold voltage UVLO configured on the control circuit IC. This also makes it possible to keep the supply voltage VCC for the control circuit IC within a typical recommended range (such as 12-24V), thereby making it possible to guarantee that the control circuit IC will operate in a stable manner while still having an overvoltage protection feature and an undervoltage-lockout feature implemented. Furthermore, this makes it possible to provide a low standby power switching power supply that is not affected by variations in component performance during mass production without having to take the trial and error approach to the power supply design process typically employed in conventional technologies.

It should be noted that the present invention is not limited to the embodiment described above. For example, the ratio between the number of coils Ns of the secondary coil S of the transformer T and the total number of coils Na of the auxiliary coil A as well as the ratio between the total number of coils Na of the auxiliary coil A and the number of coils Nb up to the center tap may be determined according to the supply voltage VCC for which the control circuit IC is designed. Moreover, the supply voltages VCC1 and VCC2 that are selected and output to the control circuit IC according to changes to the output voltage Vout do not necessarily have to be set to the same voltage.

Moreover, integrating the supply voltage switching circuit SW into a dedicated integrated circuit makes it possible to keep the number of component parts of the switching power supply from increasing. Furthermore, obtaining the control signal as an internal feedback voltage according to the loading factor of the switching power supply, for example, removes the need to apply an external control signal.

In addition, in the embodiment above the output voltage Vout is switched between two values. However, the present invention may also be applied to configurations in which the output voltage Vout is switched between three or more values. In this case, a plurality of center taps may be formed in the auxiliary coil A, and the voltages obtained at these center taps may be rectified and smoothed to generate a plurality of supply voltages. Furthermore, these supply voltages may be selected and supplied to the control circuit IC as appropriate. In addition, various other modifications may be made without departing from the spirit of the present invention.

It will be apparent to those skilled in the art that various modification and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A switching power supply, comprising:
a switching element that turns ON and OFF a current flowing through a primary coil of a transformer to which a DC input voltage is applied;
an output circuit that rectifies and smoothes a voltage induced in a secondary coil of the transformer to obtain an output voltage;
a control circuit that uses feedback control to turn ON and OFF the switching element in accordance with a feedback voltage obtained from the output voltage of the output circuit so as to generate the output voltage that is feedback controlled;
a supply voltage generation circuit that rectifies and smoothes voltages induced in an auxiliary coil provided in the transformer to generate a plurality of supply voltages;
an output voltage switching circuit that changes a relationship between said feedback voltage and the output voltage of the output circuit in accordance with a control signal provided from outside so as to set a target voltage for the feedback controlled output voltage in accordance with the control signal; and
a supply voltage switching circuit that selects one of the supply voltages generated by the supply voltage generation circuit and supplies the selected one of the supply voltages to the control circuit as a power source of the control circuit, the supply voltage switching circuit selecting said one of the supply voltages in accordance with said setting of the target voltage performed by the output voltage switching circuit,
wherein the control circuit turns the switching element OFF when the feedback voltage reaches a prescribed internal reference voltage and turns the switching element ON when the current flowing through the primary coil of the transformer while the switching element is OFF has inverted so as to generate a switching element drive signal that causes quasi-resonance in the current flowing through the primary coil of the transformer.

2. The switching power supply according to claim 1, wherein the feedback voltage is obtained as a difference between a prescribed reference voltage and a detected voltage that is detected by resistively dividing the output voltage, and wherein the output voltage switching circuit changes a resistive division ratio for dividing the output voltage in accordance with the control signal so as to change said relationship between said feedback voltage and the output voltage of the output circuit.

3. The switching power supply according to claim 1, wherein the auxiliary coil of the transformer has a center tap, and the supply voltage generation circuit rectifies and smoothes a voltage induced between end terminals of the auxiliary coil to generate a first supply voltage, and rectifies and smoothes a voltage induced between the center tap and one of the end terminals of the auxiliary coil to generate a second supply voltage.

4. The switching power supply according to claim 1, wherein the auxiliary coil of the transformer has a center tap, and the supply voltage generation circuit rectifies and smoothes a voltage induced between end terminals of the auxiliary coil to generate a first supply voltage, and rectifies and smoothes a voltage induced between the center tap and one of the end terminals of the auxiliary coil to generate a second supply voltage, wherein when said control signal causes the feedback controlled output voltage provided to a load to be set to a prescribed normal voltage, the supply voltage switching circuit selects the second supply voltage and supplies the second supply voltage to the control circuit, and wherein when said control signal causes the output voltage to switch to a standby voltage that is lower than the prescribed normal voltage, the supply voltage switching circuit selects the first supply voltage and supplies the first supply voltage to the control circuit.

5. The switching power supply according to claim 3, wherein the supply voltage switching circuit includes a pair of switching elements that are turned ON and OFF in a complementary manner in accordance with the control signal so as to supply one of the first and second supply voltages to the control circuit.

6. The switching power supply according to claim 5, wherein the first and second supply voltages are set within a range defined by an overvoltage protection threshold voltage OVP and an undervoltage lockout threshold voltage UVLO of the control circuit.

7. A switching power supply, comprising:
a switching element that turns ON and OFF a current flowing through a primary coil of a transformer to which a DC input voltage is applied;
an output circuit that rectifies and smoothes a voltage induced in a secondary coil of the transformer to obtain an output voltage;
a control circuit that uses feedback control to turn ON and OFF the switching element in accordance with a feedback voltage obtained from the output voltage of the output circuit so as to generate the output voltage that is feedback controlled;
a supply voltage generation circuit that rectifies and smoothes voltages induced in an auxiliary coil provided in the transformer to generate a plurality of supply voltages;
an output voltage switching circuit that changes a relationship between said feedback voltage and the output voltage of the output circuit in accordance with a control signal provided from outside so as to set a target voltage for the feedback controlled output voltage in accordance with the control signal; and
a supply voltage switching circuit that selects one of the supply voltages generated by the supply voltage generation circuit and supplies the selected one of the supply voltages to the control circuit as a power source of the control circuit, the supply voltage switching circuit selecting said one of the supply voltages in accordance with said setting of the target voltage performed by the output voltage switching circuit,
wherein the auxiliary coil of the transformer has a center tap, and the supply voltage generation circuit rectifies and smoothes a voltage induced between end terminals of the auxiliary coil to generate a first supply voltage, and rectifies and smoothes a voltage induced between the center tap and one of the end terminals of the auxiliary coil to generate a second supply voltage, and
wherein the supply voltage switching circuit includes a pair of switching elements that are turned ON and OFF in a complementary manner in accordance with the control signal so as to supply one of the first and second supply voltages to the control circuit.

8. The switching power supply according to claim 7, wherein the feedback voltage is obtained as a difference between a prescribed reference voltage and a detected voltage that is detected by resistively dividing the output voltage, and wherein the output voltage switching circuit changes a resistive division ratio for dividing the output voltage in accordance with the control signal so as to change said relationship between said feedback voltage and the output voltage of the output circuit.

9. The switching power supply according to claim 7, wherein the first and second supply voltages are set within a range defined by an overvoltage protection threshold voltage OVP and an undervoltage lockout threshold voltage UVLO of the control circuit.

10. A switching power supply, comprising:
a switching element that turns ON and OFF a current flowing through a primary coil of a transformer to which a DC input voltage is applied;
an output circuit that rectifies and smoothes a voltage induced in a secondary coil of the transformer to obtain an output voltage;
a control circuit that uses feedback control to turn ON and OFF the switching element in accordance with a feedback voltage obtained from the output voltage of the output circuit so as to generate the output voltage that is feedback controlled;
a supply voltage generation circuit that rectifies and smoothes voltages induced in an auxiliary coil provided in the transformer to generate a plurality of supply voltages;
an output voltage switching circuit that changes a relationship between said feedback voltage and the output voltage of the output circuit in accordance with a control signal provided from outside so as to set a target voltage for the feedback controlled output voltage in accordance with the control signal; and
a supply voltage switching circuit that selects one of the supply voltages generated by the supply voltage generation circuit and supplies the selected one of the supply voltages to the control circuit as a power source of the control circuit, the supply voltage switching circuit selecting said one of the supply voltages in accordance with said setting of the target voltage performed by the output voltage switching circuit, wherein the auxiliary coil of the transformer has a center tap, and the supply voltage generation circuit rectifies and smoothes a voltage induced between end terminals of the auxiliary coil to generate a first supply voltage, and rectifies and smoothes a voltage induced between the center tap and one of the end terminals of the auxiliary coil to generate a second supply voltage, wherein when said control signal causes the feedback controlled output voltage provided to a load to be set to a prescribed normal voltage, the supply voltage switching circuit selects the second supply voltage and supplies the second supply voltage to the control circuit, and wherein when said control signal causes the output voltage to switch to a standby voltage that is lower than the prescribed normal voltage, the supply voltage switching circuit selects the first supply voltage and supplies the first supply voltage to the control circuit.

11. The switching power supply according to claim 10, wherein the feedback voltage is obtained as a difference between a prescribed reference voltage and a detected voltage that is detected by resistively dividing the output voltage, and wherein the output voltage switching circuit changes a resistive division ratio for dividing the output voltage in accordance with the control signal so as to change said relationship between said feedback voltage and the output voltage of the output circuit.

12. The switching power supply according to claim 10, wherein the first and second supply voltages are set within a range defined by an overvoltage protection threshold voltage OVP and an undervoltage lockout threshold voltage UVLO of the control circuit.

* * * * *